March 25, 1958 R. W. FOLEY 2,828,052
AGITATOR DRIVE FOR FERTILIZER SPREADER
Filed Feb. 17, 1955 2 Sheets-Sheet 1
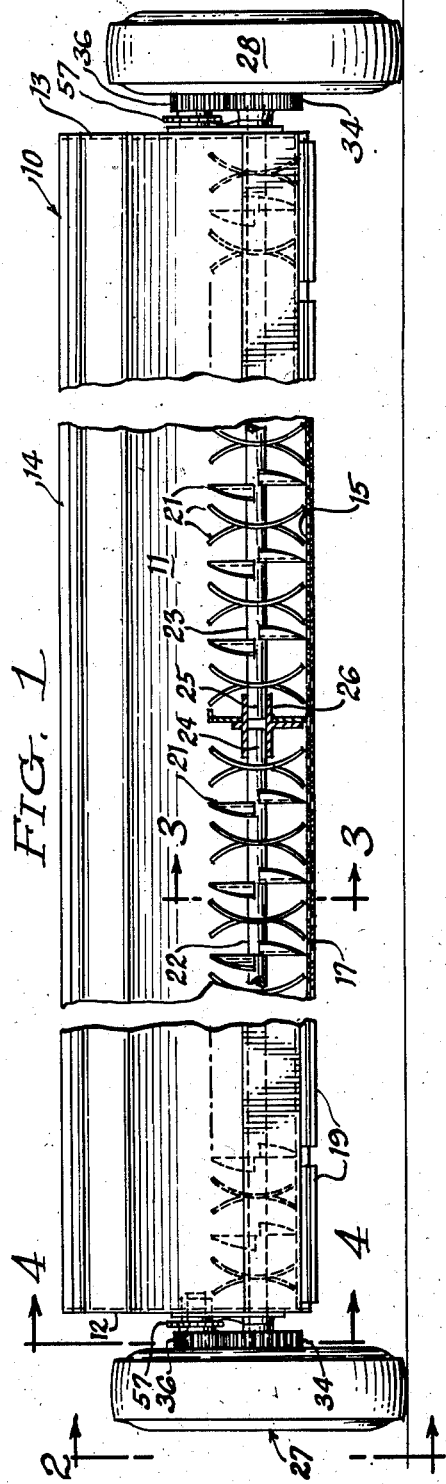
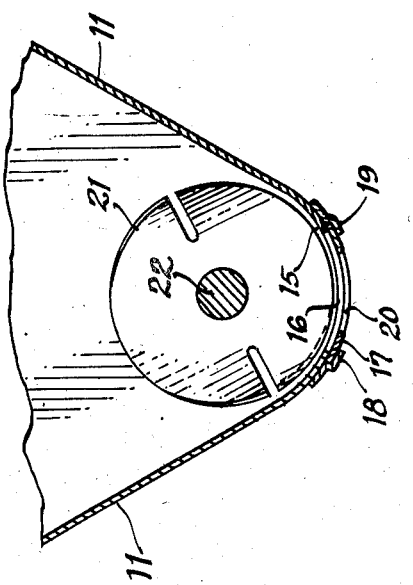
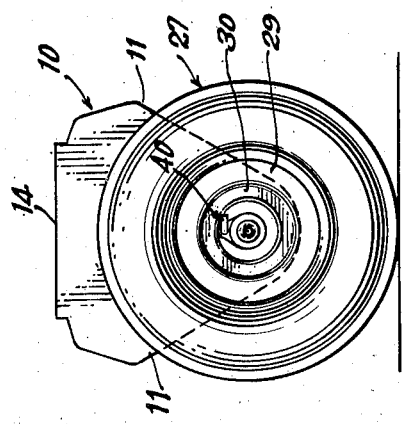
INVENTOR.
Russell W. Foley
BY
Attorney

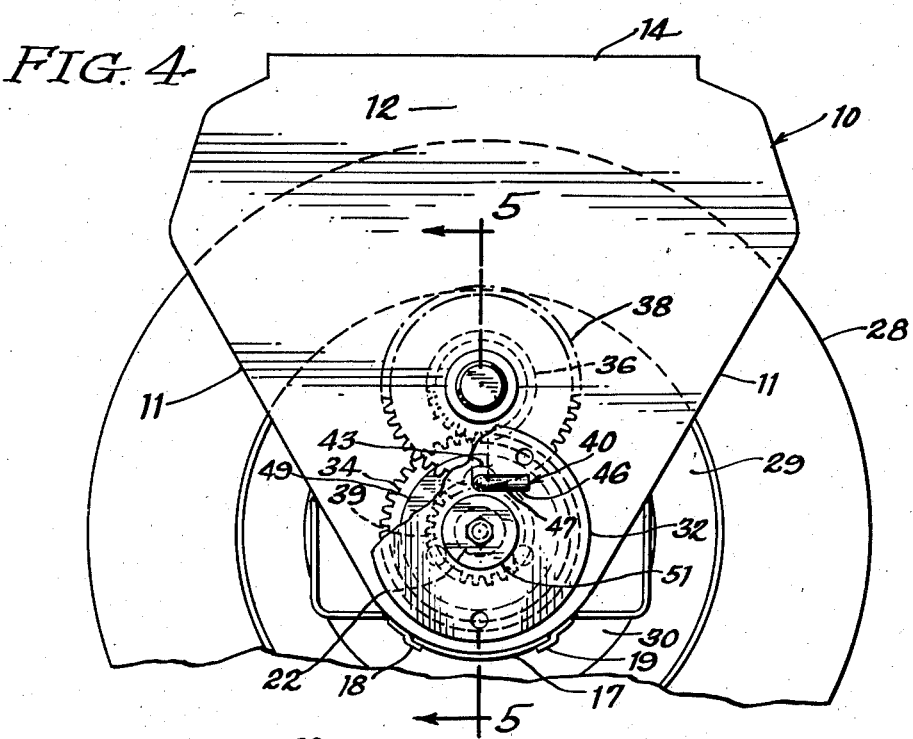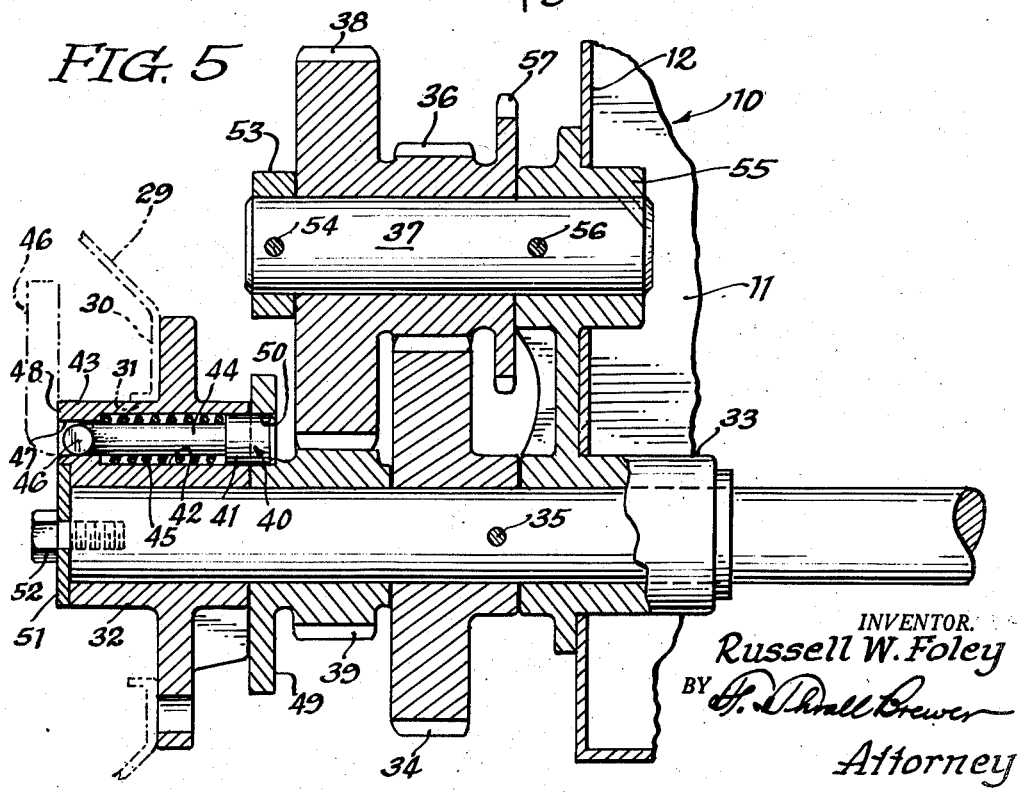

United States Patent Office
2,828,052
Patented Mar. 25, 1958

2,828,052

AGITATOR DRIVE FOR FERTILIZER SPREADER

Russell W. Foley, Maywood, Ill.

Application February 17, 1955, Serial No. 488,754

2 Claims. (Cl. 222—177)

This invention relates to farm implements such as fertilizer spreaders and particularly to an agitator drive therefor.

It is common practice among farmers to use fertilizer spreaders for sowing grass seed. The rate of feed of grass seed per acre is considerably less than the rate of feed of fertilizer or lime for the same area. Although the rate of feed may be adjusted in substantially all well known fertilizer spreaders, the accuracy with which the material is fed tends to vary inversely as the quantity of material to be spread over a given area. Thus the fewer the number of pounds of fertilizer to be spread per acre, the less accurate the spreading becomes, that is, the less uniformity of spreading that can be achieved. It may be readily apparent, therefore, that when a fertilizer spreader is used to sow grass seed, the result is apt to be very uneven unless special attachments are used to handle the grass seed.

In one commercial form of spreader, grass seed may be sown with somewhat the desired evenness by placing it in a separate hopper which parallels the hopper generally used for the fertilizer, and providing a special speed reducing drive for the grass seed agitating and feeding mechanism which slows down its operation relative to the ground speed of the spreader. This, of course, involves additional cost in that portions of the equipment must be duplicated to handle the grass seed.

It is an object of this invention to provide a spreader which may be used to sow fine seed as well as to spread powdered or granular fertilizer or lime, without requiring the use of duplicate hoppers and agitators, but which nevertheless will sow the seed at a desired relatively low rate with extreme uniformity.

A more specific object of this invention is the provision, in a fertilizer spreader having a well known form of agitator and rate of flow control, of means for changing the speed of operation of the agitator relative to the speed of the wheels of the spreader to slow down its operation and thereby to secure a more uniform control of the rate of feed of material in the associated hopper.

As a still more specific object, this invention seeks to provide a simple and rugged change-speed transmission for the agitator of a fertilizer spreader or the like by which the speed of the agitator may be quickly and conveniently changed to permit the accurate and uniform spreading of small quantities of material.

These and other objects of this invention will become apparent from the following detailed description when taken together with the accompanying drawings in which:

Fig. 1 is a fragmentary front elevational view of a fertilizer spreader to which this invention has been applied, with portions of the hopper cut away to show the details of the agitator;

Fig. 2 is a side elevational view of the spreader taken in the direction of the arrows 2—2 of Fig. 1;

Fig. 3 is an enlarged fragmentary side elevational view in section of the hopper of the spreader of Fig. 1, the view being taken in the direction of the arrows 3—3 of Fig. 1;

Fig. 4 is an enlarged fragmentary side elevational view of the spreader of Fig. 1, taken in the direction of the arrows 4—4 of Fig. 1, with portions of the mechanism cut away to show the arrangement of the gears in the change-speed transmission thereof; and Fig. 5 is a greatly enlarged front elevational view in section of the change-speed transmission of the spreader of Fig. 1, the view being taken in the direction of the arrows 5—5 of Fig. 4.

Referring now to the drawings for a detailed description of the invention, the fertilizer spreader as shown in Fig. 1 is comprised of a hopper 10 of generally elongated trough-like form preferably made of sheet metal and having sides 11, ends 12 and 13, a cover 14, and a bottom 15. The sides 11 and bottom 15 are preferably made from an integral piece of sheet metal which has been formed into a V-shape in cross section, the apex of the V being smoothly rounded to form a segment of a cylinder. A plurality of openings 16 are formed at spaced intervals along the bottom 15 through which the fertilizer or other material to be spread may be dropped. The effective size of the openings 16 is controlled by a sheet metal shutter 17 shaped to conform to the exterior surface of the bottom 15 of the hopper and retained between spaced guides 18 and 19 secured to bottom 15. Shutter 17 has openings 20 formed therein which may be progressively aligned with openings 16, thus to vary the effective area of the latter.

Immediately over openings 16 are a plurality of agitators 21 adapted to be rotated as the spreader moves along the ground to cause the material in the hopper to be passed over openings 16. The shape of the agitators is such as to promote the controlled movement of the material from the hopper into the openings 16. The agitators 21 are mounted on shafts 22 and 23 extending lengthwise of hopper 10 and uniformly spaced from the bottom 15 thereof. The inner ends 24 and 25 of shafts 22 and 23, respectively, are supported by a center bearing 26 secured to hopper 10 by welding or otherwise.

The outboard construction on each side of hopper 10 is identical for the left hand and right hand wheels as viewed in Fig. 1 and accordingly but one side will be described herein in detail. It is understood that the left hand and right hand parts are interchangeable for economy of manufacture and for ease of repair and reduction of inventory of spare parts.

The spreader is carried by spaced metal wheels 27, 28 which may or may not have rubber tires, and which preferably are of dished disc form. As shown in Figs. 2 and 5, the disc 29 has a central flat face 30 and a flanged opening 31 for attachment to a flanged hub 32 mounted for free rotation about the outboard end of shaft 22. Said shaft 22 is supported in end 12 by a bearing 33 secured to end 12 in any suitable manner. Adjacent bearing 33 and disposed outside hopper 10 is a spur gear 34 which is secured to shaft 22 by a pin 35 so as to be rotatable therewith at all times. Spur gear 34 meshes with a pinion gear 36 mounted on a countershaft 37 preferably disposed immediately above shaft 22, pinion gear 36 forming one of a cluster of gears the second 38 of which meshes with a pinion gear 39 mounted for free rotation on shaft 22. The relative sizes of the gears are such that when pinion gear 39 is the driver, spur gear 34 and its connected shaft 22 will rotate at a much lesser speed than gear 39. In the form chosen to illustrate this invention, the proportions of the gear diameters are such as to give a 4-to-1 speed reduction. It is understood, however, that other ratios may be used as desired. Thus, gears 39, 38, 36 and 34 constitute a speed reducing mechanism by which shaft 22 can be driven more slowly than wheels 29.

A connection is effected between wheel 29 and drive gear 39 by a pin clutch shown generally at 40 in Figs. 4 and 5 and comprising an axially slidable pin 41 disposed in an opening 42 formed in an ear 43 integral with hub 32. Pin 41 is controlled by an operating rod 44 disposed in opening 42 and is of lesser diameter than pin 41 to provide a space for a compression spring 45 which holds the pin in engaged position. Opening 42 is of reduced diameter at its left hand end as viewed in Fig. 5 to provide a support for rod 44 and an abutment for spring 45. The free end 46 of rod 44 is bent at right angles to the axis of rod 44 to form a handle by which the rod and pin may be operated. When pin 41 is in its engaged position, handle 46 is disposed in a slot 47 extending horizontally from the opening in which pin 41 operates. When pin 41 is in its disengaged position, it is withdrawn to the left as viewed in Fig. 5 in opening 42, and handle 46 then assumes the position shown in dotted outline in Fig. 5 wherein it abuts the outer face 48 of gear 43. In the latter position, the force of spring 45 holds the handle in place so that the spreader may be wheeled without operating its agitators.

Formed integrally with gear 39 is a flange 49 axially spaced from gear 39 and provided with one or more openings 50 of a size and location to receive pin 41 when said pin is in its engaged position. As may be apparent from Fig. 5, when pin 41 is received in opening 50, flange 49 and its associated gear 39 are constrained to rotate with hub 32. When, on the other hand, pin 41 is withdrawn from opening 50, hub 32 and flange 49 are then disconnected and hub 32 and its wheel 29 may rotate freely about shaft 22 without turning gear 39.

Hub 32 and gear 39 are retained on shaft 22 by a washer 51 which may be secured to the end of shaft 22 by a bolt 52, the washer extending radially outwardly beyond the cylindrical surface of shaft 22 to act as an axial abutment for hub 32. Similarly, gears 38 and 36 are retained on countershaft 37 by a ring 53 which may be secured to countershaft 37 by a pin 54. The opposite end of shaft 37, that is, the end adjacent hopper 10, is secured to a relatively long apertured boss 55 by a pin 56, boss 55 preferably forming part of a unitary casting in which is formed bearing 33. A sprocket 57 may be formed integrally with gears 36 and 38 to provide a means for driving a seeder which may be attached to hopper 10 in the customary manner if desired.

It may be noted from Fig. 1 that since shafts 22 and 23 are not connected, each wheel 27, 28 may rotate independently of the other. Thus when the spreader is making a turn the wheel on the outside of the turn may rotate faster than the one on the inside and the quantity of material spread by the device can thus be made to vary across the spreader.

The operation of the spreader and its transmission is believed to be evident from the description thus far given. Suffice it to say that when it is desired to operate the agitators 21, pin clutch 40 is engaged by turning handle 46 until it is aligned with slot 47. If at that point pin 41 is not in alignment with an opening 50, the spreader may be wheeled a short distance until such alignment occurs, whereupon spring 45 will snap pin 41 into the aligned opening 50. To stop the agitators, handle 46 is pulled outwardly and then turned through approximately ninety degrees.

With a slower moving agitator, much finer control of the flow of material out of hopper 10 can be had. The effective openings 16, 17 may be larger for a given rate of flow and they are accordingly less susceptible to becoming clogged.

It is understood that the foregoing description is merely illustrative of a preferred embodiment of the invention and that the scope of the invention is therefore not to be limited thereto but is to be determined by the appended claims.

I claim:

1. In a spreader for powdered or granular material such as fertilizer, seeds or the like, having a hopper, and an agitator shaft in the hopper extending through said hopper at one end thereof, a bearing support for the agitator shaft secured to the hopper, a countershaft mounted on the bearing support, a road wheel, a hub for the road wheel mounted on the outer end of the agitator shaft and freely rotatable thereon, a pair of gears on the agitator shaft disposed between the wheel hub and the bearing support, the one of said gears adjacent the hub being freely rotatable on the agitator shaft and the other of said gears being fixed to and rotatable with the agitator shaft, gears on the counter-shaft meshing with the gears on the agitator shaft and providing therewith a speed reducing drive, an axially extending flange on the freely rotatable agitator shaft gear having an axially disposed opening therein, an axially reciprocable clutch pin extending through the wheel hub and adapted in one axial position to be received in the said axially disposed opening and in another axial position to be free of said opening whereby to establish or release a drive from the wheel hub to the freely rotatable axial shaft gear, and means disposed on the exterior of the hub for shifting the clutch pin.

2. The combination described in claim 1, said hub having an axially extending apertured ear having a counterbore therein to form a shoulder, said pin having a shoulder at one end and a bend at the opposite end exteriorly of the hub, and a spring within the ear and compressed between the shoulder on the pin and the shoulder formed by the counterbore whereby to urge the pin into the flange opening.

References Cited in the file of this patent
UNITED STATES PATENTS

| | | |
|---|---|---|
| 2,143,801 | Self | Jan. 10, 1939 |
| 2,180,253 | Moore | Nov. 14, 1939 |
| 2,522,693 | Stiteler | Sept. 19, 1950 |
| 2,554,637 | Rerick | May 29, 1951 |
| 2,558,352 | Gandrud | June 26, 1951 |
| 2,680,539 | Seltzer | June 8, 1954 |